United States Patent [19]

Gibson

[11] 3,745,248

[45] July 10, 1973

[54] COARSE INITIAL TIMING RECOVERY CIRCUIT

[75] Inventor: Earl D. Gibson, Huntington Beach, Calif.

[73] Assignee: North American Rockwell Corporation, Anaheim, Calif.

[22] Filed: Nov. 16, 1970

[21] Appl. No.: 89,968

[52] U.S. Cl. ............ 178/69.5 R, 325/321, 328/155, 328/63

[51] Int. Cl. ............ H04l 7/00

[58] Field of Search ............ 178/69.5 R; 325/324, 325/325, 321, 41, 42, 65; 328/63, 72, 155; 179/15 BS; 307/269

[56] References Cited

UNITED STATES PATENTS

| | | | |
|---|---|---|---|
| 3,209,265 | 9/1965 | Baker et al. | 328/63 |
| 3,462,687 | 8/1969 | Becker et al. | 325/324 |
| 3,544,717 | 12/1970 | Smith | 178/69.5 R |
| 3,585,298 | 6/1971 | Liberman | 178/69.5 R |

*Primary Examiner*—Robert L. Griffin
*Assistant Examiner*—John C. Martin
*Attorney*—L. Lee Humphries, H. Fredrick Hamann and Edward Dugas

[57] ABSTRACT

The timing recovery circuit of the present invention is designed for use with a receiver for receiving digital data signals transmitted at a baud rate at which these signals contain intersymbol interference components. The recovery circuit is comprised of a threshold crossing detector which provides an output signal each time the received signal passes through one of several preselected amplitude levels. An EARLY/LATE detector compares an output baud timing pulse train against the output signal from the threshold crossing detector and provides a first signal when the output signal is late and a second signal when the output signal is early. A pulse train generating means provides a train of pulses occurring at substantially an integer multiple of the baud timing rate to a pulse ADD/DELETE circuit. The ADD/DELETE circuit in response to the first or second signal adds or deletes a pulse from the provided pulse train to synchronize this pulse train to an integer multiple of the correct baud timing. A frequency divider chain following the ADD/DELETE circuit divides the pulse repetition rate down to the baud rate, maintaining the proper phase of the frequency divider output pulse train.

11 Claims, 8 Drawing Figures

INVENTOR
EARL D. GIBSON
BY Edward Dugas
ATTORNEY

DESIRED BAUD SAMPLE TIME

OUTPUT BAUD TIMING

ONE-SHOT OUTPUT

EXAMPLE OF THRESHOLD CROSSING
DETECTOR OUTPUT

E = EARLY BAUD TIMING
L = LATE BAUD TIMING

INVENTOR
EARL D. GIBSON
BY Edward Dugas
ATTORNEY

INVENTOR
EARL D. GIBSON
BY Edward Dugas
ATTORNEY

Patented July 10, 1973 3,745,248

4 Sheets-Sheet 4

INVENTOR
EARL D. GIBSON
BY
Edward Dugas
ATTORNEY

COARSE INITIAL TIMING RECOVERY CIRCUIT

BACKGROUND OF THE INVENTION

The present invention relates generally to timing recovery devices and more particularly to a coarse initial timing recovery device for use in high speed synchronous data transmission systems.

In the past, various techniques utilizing phase-lock loops have been used to synchronize the receiver baud timing in phase and frequency with the baud timing of the received signal. Heretofore, such systems have required the transmission of some type of signal in addition to the information signals, to be used by the phase-lock loops to recover the baud timing. Some prior art systems have used pilot tones which are added to the transmitted signal and which are detected in the receiver to give the timing signals which in turn are used to synchronize samplers, decision devices and/or related devices contained in the receiver. For those systems which utilize a pilot tone, the signal energy available for information is decreased due to the allocation of a portion of this energy to the pilot tone generation. The conventional systems which employ phase-lock loops in which the input signal includes noise or extraneous signals as well as the desired signal operate by applying to a multiplier or phase detector the received tone signal as well as the output of a continuously variable voltage controlled oscillator. The multiplier or phase detector yields an output signal which is proportional to the phase error or which is some function of the phase error. This phase error signal is generally low pass filtered to eliminate all components other than a d-c component. The d-c component is then amplified and fed to the voltage controlled oscillator to control its frequency.

In high speed data transmission, one transmitted tone is ordinarily inadequate to precisely determine the proper bit timing in the receiver due to the frequency translation, pahase-frequency distortion and phase jitter introduced by the channel. By transmitting two tones and using two phase-locked loops in the receiver, it is possible to recover a baud timing signal free of frequency translation and phase jitter; but, this signal is usually offset in phase from the proper bit timing signal because of the non-linearity of the phase-frequency characteristic of the channel. The equipment necessary to determine and correct this phase offset is approximately as costly as the entire timing recovery described herein. Also, the tones must be transmitted near the edges of the channel passband where the distortion is often severe; and, the extra bandwidth required to permit tracking of the tones in the presence of the phase jitter is often crcucially important. Therefore, it would be highly desirable in many applications to have a system which approximately determines the baud timing rate in the face of strong intersymbol interference to allow adequate detection of the received symbols without requiring the loss in signal energy and bandwidth or costly equipment.

Another approach to timing recovery is based upon zero-crossings of the received baseband signal. However, this approach is unsuitable for use with various desirable types of signaling, such as the methods of partial responses, because the received baseband signal often stays near zero throughout substantial time intervals so that small noise of inter-symbol interference can cause erroneous zero-crossing indications, causing erroneous timing. The approach described herein is designed to provide accurate timing for both conventional signaling and the various methods of partial responses in the presence of noise, relatively strong intersymbol interference, and related disturbances.

SUMMARY OF THE INVENTION

In the preferred embodiment of the invention, there is provided a threshold crossing detector means for providing an output pulse each time the received baseband signal passes through one of two predetermined threshold levels. The threshold levels can be determined by applying the received signal to an oscilloscope with the horizontal sweep time of the oscilloscope being synchronized to an integer number of band intervals of time so as to create an "eye" pattern with one threshold level being set in the middle of the upper "eye" pattern and the other threshold level in the middle of the lower "eye." An EARLY/LATE detector means receives as an input the output baud timing signal and compares that signal with the output pulse from the threshold crossing detector to provide a first signal indicative of whether the threshold crossing detector signal occurs late with respect to the output timing signal or provides a second signal when the threshold crossing detector output occurs early with respect to the output timing signal. A stable clock means provides a continuous train of pulses having a repetition rate greater than the baud rate. A frequency divider receives this provided chain of pulses and divides the pulse rate to a first level which is greater than the repetition rate of the baud transmission, with the output of the frequency divider being fed to a pulse ADD or DELETE circuit, which circuit is responsive to the first provided LATE signal and the second provided EARLY signal to either add or delete a pulse from the first frequency divider so as to adjust the provided output pulse train signal to correspond in phase to the input baseband signal. A second frequency divider means divides the frequency output of the pulse ADD-/DELETE circuit to correspond to the band timing of the original baseband signal such that the output baud timing signal is coerced into phase and frequency alignment with the received signal.

It is, therefore, an object of the present invention to provide a coarse initial timing recovery system for use with a digital data transmission system.

Accordingly, it is another object of the present invention to provide a timing recovery device which may be utilized with received signals containing strong intersymbol interference.

It is another object of the present invention to provide a timing recovery device which is simple in operation and which is not susceptible to drift errors.

These and additional objects will become more apparent when taken in conjunction with the following description and drawings in which like characters indicate like parts.

DESCRIPTION OF THE PREFERRED EMBODIMENT

Figure 1:
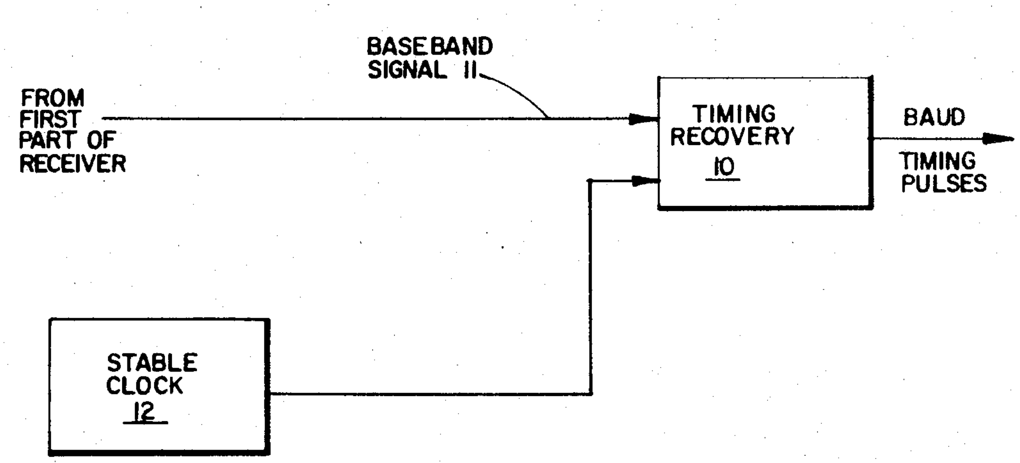
FIG. 1 illustrates in block diagram form the timing recovery circuit of the present invention.
Figure 2:
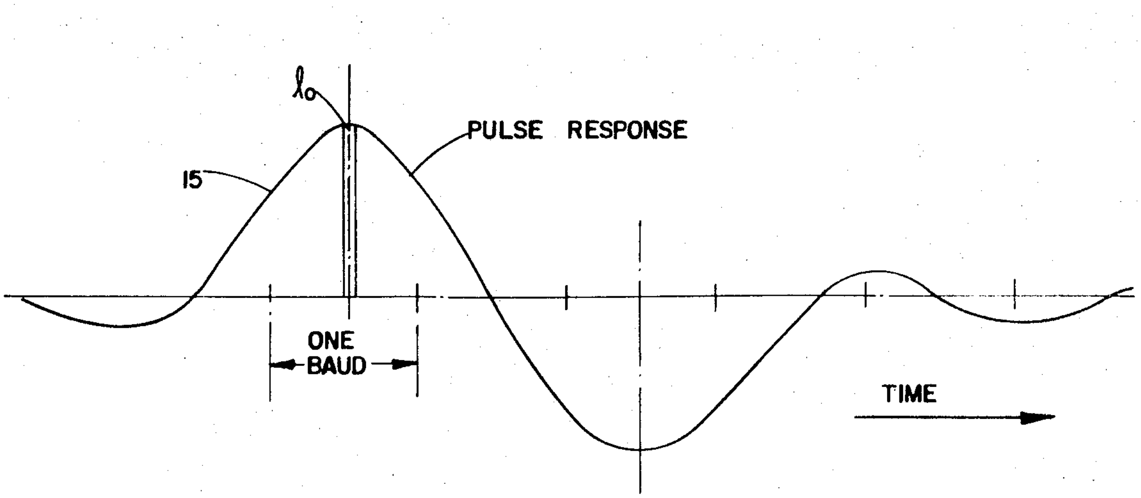
FIG. 2 is a waveform illustrating the general shape of the pulse response signal received by the circuit of FIG. 1.
Figure 3:
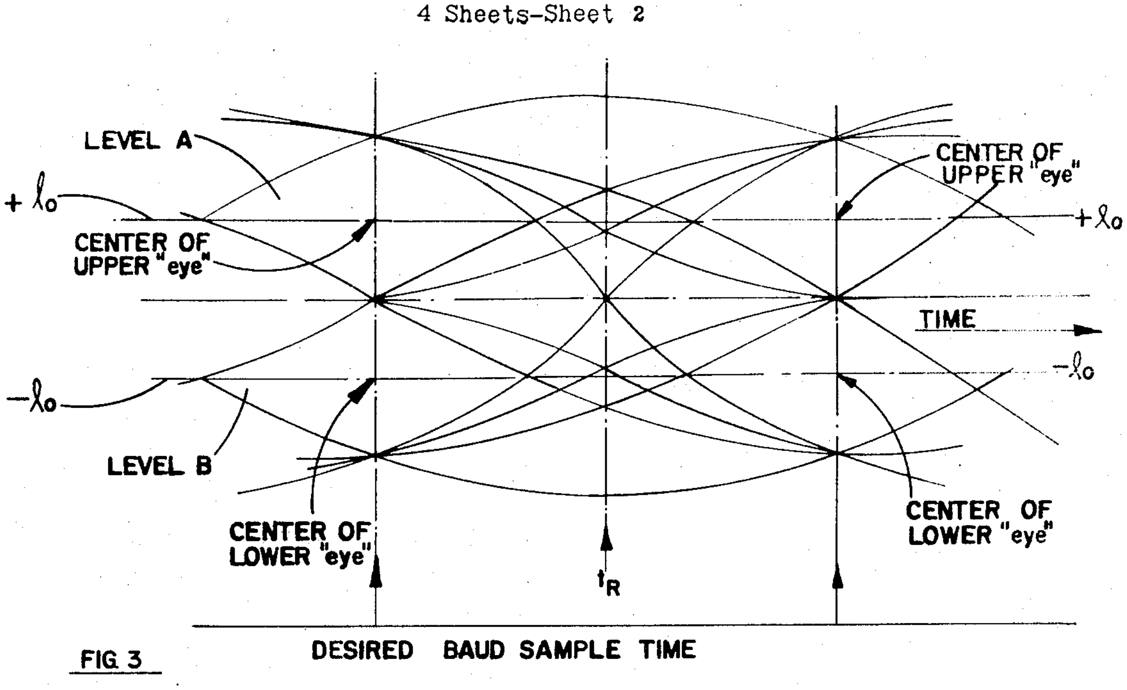
FIG 3 is a typical "eye" waveform pattern of received signals.

Referring to FIG. 1, baseband signal 11, having a baud transmission rate is received by a timing recovery means 10 along with a timing pulse train signal 13 generated by a stable clock 12. The output from the timing recovery means 10 is an adjusted timing pulse train which is in frequency and phase synchronization with the baud rate of the baseband signal. The received baseband signal is of the type, for example, received by the transmission channel in U.S. Pat. No. 3,651,316 entitled "Automatic Transversal Equalizer System," By Earl D. Gibson. In that patent the received baseband signal is labeled 30 in FIG. 1 and is distorted in form due to the characteristics of the overall communications channel. The general shape of the overall channel pulse response, as seen in the received baseband signal, is shown in FIG. 2 as signal 15. The received baseband signal consists of the superposition of a train of such pulse responses received at the baud rate. When the received signal is displaced on an oscilloscope, using one horizontal oscilloscope sweep per two baud times, an "eye" pattern of the type shown in FIG. 3 is obtained. Two threshold volage levels are shown, labeled $+l_o$ and $-l_o$. The initial values assigned to these levels are calculated in advance and are based upon the receiver AGC design. These values are set to the best apriori estimate of the top center level of the upper "eye" opening, labeled A, and the lower "eye" opening, labeled B. From an observation of this "eye" pattern, we see that the times when the signal passes through either threshold level, $+l_o$ or $-l_o$, are dispersed about integer multiples of the baud duration. By averaging out (eliminating) this dispersion, as well as most of the noise, we can obtain a timing (or phase) reference, labeled $t_R$. The locally generated, stable timing pulse train is locked in phase to the obtained timing reference $t_R$.

In the type of signaling shown in FIG. 2, for example, the threshold level $l_o$ is the amplitude of the first main peak of the overall transmission system pulse response, as seen at the input of the timing recovery device; i.e., the first main peak of the signal that is received by the timing recovery device when a single isolated digit is transmitted. The other threshold level is set equal to $-l_o$. When a sufficiently accurate AGC already exists elswehere in the receiver, these threshold levels can be determined and fixed in advance. The $+l_o$ signal entering comparator 21 and the $-l_o$ signal entering comparator 23 are then fixed voltages which can be taken from d-c power supplies, either directly or through voltage dividers.

Figure 4:
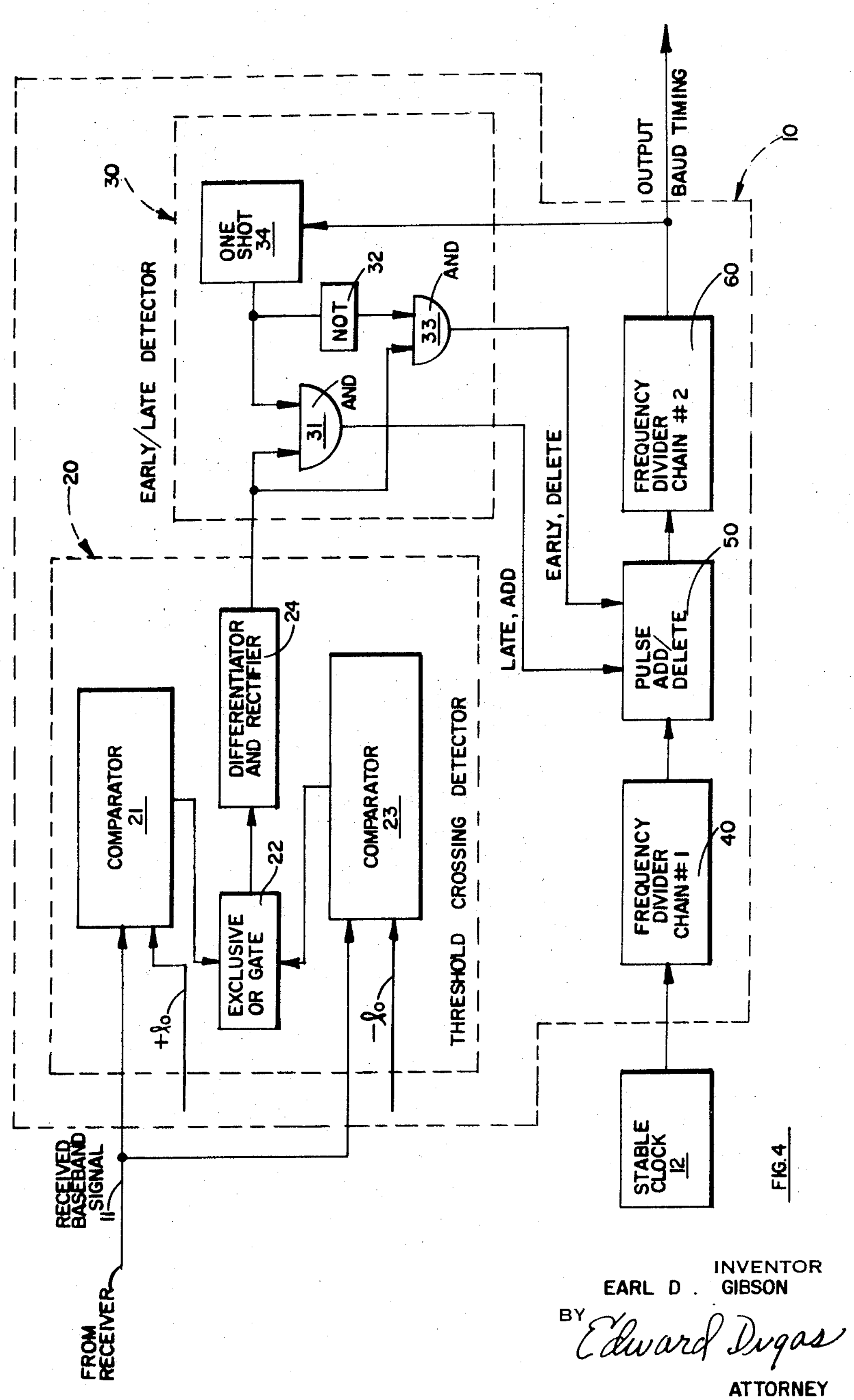
FIG. 4 is a more detailed schematic block diagram of the initial timing recovery means shown in FIG. 1.

FIG. 4 presents a block diagram of the initial timing recovery circuit for implementing the detection of $t_R$ and for locking a locally generated, stable timing pulse train to the phase of the timing reference $t_R$. The baseband signal 11 is fed to a comparator 21 and a comparator 23. Comparator 21, in addition, receives the $+l_o$ reference level signal with comparator 23 receiving the $-l_o$ reference signal. Comparator 21 generates a binary "one" output when the baseband signal is above the $l_o$ level and comparator 23 generates a binary "one" when the baseband signal is below $-l_o$. When the baseband signal level passes through either threshold, one and only one of the comparator outputs changes binary state. The exclusive OR gate 22 receives as inputs the outputs from comparators 21 and 23. Therefore, the output of the exclusive OR gate 22 changes state when, and only when, either of the two comparator outputs changes binary state; i.e., when the baseband signal 11 passes through one of the two threshold levels. The exclusive OR gate 22 thus generates a step change in signal level when the received baseband signal 11 passes through one of the threshold levels. The output of the exclusive OR gate 22 goes to the differentiator 24 which converts each step change in signal level to a narrow pulse. The output of the differentiator is the output of the threshold crossing detector 20 which is fed to an EARLY/LATE detector 30. The EARLY/LATE detector is comprised of a one-shot multivibrator 34, gates 31 and 33, and a NOT circuit 32. The signal from the output of the timing recovery means is fed to the one-shot multivibrator 34. The one-shot generates a pulse of one-half baud duration, starting at the time of the baud timing pulse entering the one-shot.

Figure 5A:
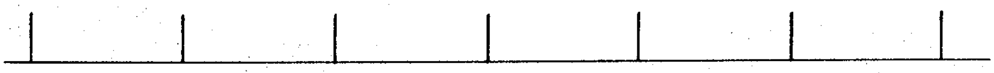
FIGS. 5a, 5b and 5c illustrate waveforms existing at various points in the block diagram of FIG. 1.
Figure 5B:
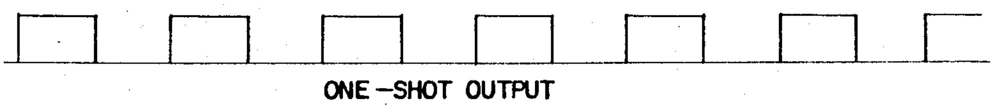
Figure 5C:
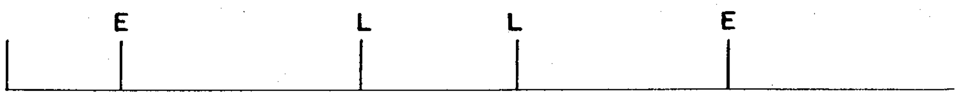

FIG. 5a shows the timing relationships upon which the EARLY/LATE detechion is based. The output baud timing pulses mark the center of each baud interval. This timing is to be locked in phase with the center of the "eye" openings illustrated in FIG. 3 and is the timing that is to be supplied to other parts of the operating receiver. AND gates 31 and 33 receive as one of their inputs the differentiator signal and as their other input a signal from the one-shot 34 which signal for AND gate 33 is passed first through the NOT gate 32. The outputs of the EARLY/LATE detector from AND gates 31 and 33 are labeled L for late and E for early, respectively. In effect, if the pulse is late, there must be an added increment and if the pulse is early, an increment must be deleted in order to move the phase of the reference clock into adjustment with the baseband signal. FIG. 5b illustrates the output from the one-shot 34. FIG. 5c shows an example of the threshold crossing detector outputs labeled E for the output of AND gate 33 and L for the output of AND gate 31. The mean timing of the threshold crossing indicates the edges of the baud times; where as we wish the output baud timing to indicate the centers of the baud times (the center of the "eye"). Therefore, there should be a one-half baud displacement between the output baud timing and the mean timing of the threshold crossing detector output. When a threshold crossing detector output occurs when the one-shot is off, early baud timing is indicated. Late baud timing is indicated when a threshold detector output occurs when the one-shot is on. When the two inputs to AND gate 31 occur simultaneously, this AND gate generates an output indicating that the baud timing is late. The NOT circuit 32 and AND 33 are arranged so that a pulse appears at the output of AND gate 33 whenever the threshold detector generates an output while the one-shot is off, thus indicating early baud timing. The pulse ADD/DELETE circuit 50 receives as inputs the late and early signals. The output from the stable clock 12 is fed to a frequency divider chain 40, the output of which is fed to the pulse ADD/DELETE circuit 50. In operation, whenever a late indication is obtained from AND gate 31, a pulse is added to the output of frequency divider chain 40 and whenever an early indication from AND gate 33 occurs, a pulse is deleted from the output of frequency divider chain 40. Each addition or deletion of a pulse causes a small phase advance or retardation, respectively, of the baud timing that appears at the output of frequency divider 60. The size of this incremental advance or retardation depends upon the frequency division ratio used in the frequency divider chain 60. The two frequency divider chains 40 and 60 together divide the stable clock frequency down to the system baud rate. The best choice of increment size depends upon the particular application and for the system shown in the referenced U.S. Pat. No. 3,651,316, utilizing a 9.6 kb per second system, the increment size of approximately $2^{-11}$ baud intervals is considered a good choice. Since most of the increments will be in the correct direction when the timing error is large and threshold crossings occur on about one-half of the bauds, the maximum time required to pull into approximately correct timing will be approximately 4,000 bauds. Because noise and "time jitter" will rarely cause the timing to be in error by more than about 10 increments, the coarse initial timing will then seldom be in error by more than about 0.005 baud intervals after the initial pull-in. To achieve this increment size, frequency divider chain 60 should divide the frequency by $2^{11}$.

Figure 6:
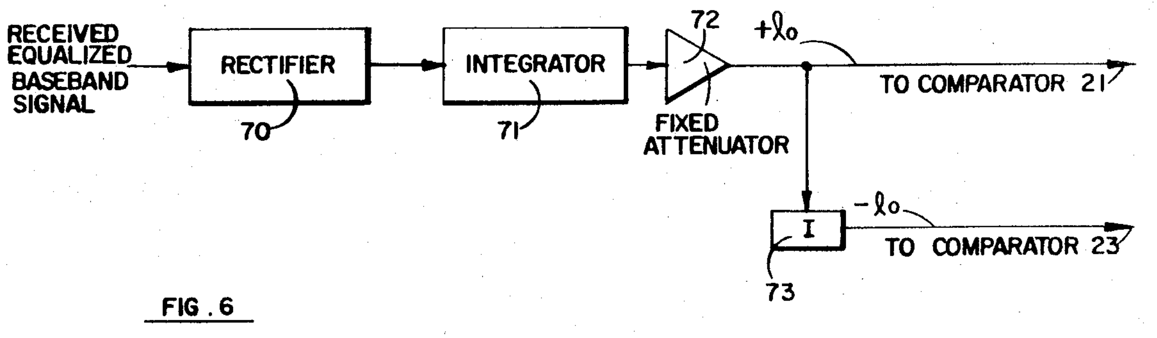
FIG. 6 is a block diagram of a threshold level determining means which can be used with the circuit of FIGS. 1 and 4.

This timing recovery scheme can also be used for finer and more accurate timing after the initial, coarse timing recovery. For example, after the initial timing recovery, the pulse ADD/DELETE circuit should be switched to an intermediate point in frequency divider chain 40 so that more of the overall frequency division occurs after the pulse add/deletion instead of before the pulse add/deletion. When a sufficiently accurate AGC does not already exist, for example, voltages equal to $l_o$and $- l_o$ can be derived and used as the threshold signals entering the comparators. The mean absolute amplitude of the received baseband signal (after equalization when equalization is required) is approximately equal to $l_o$ in the type of signaling shown in FIG. 2 and proportional to $l_o$ in other types of signaling. Therefore, the arrangement shown in FIG. 6 is one method of establishing the threshold reference signals $l_o$ and $- l_o$. The received, equalized baseband signal goes first through a rectifier and an integrator (or an averaging device). The integrator output signal voltage is proportional to $l_o$. The signal then goes through a fixed, preset attenuator to obtain a voltage equal to $l_o$, which voltage goes to comparator 21 as the threshold reference. The signal from the fixed attenuator is also inverted and then used as the threshold reference for comparator 23.

The type of signaling shown in FIG. 2 and the associated "eye" pattern shown in FIG. 3 are for illustrative purposes only. The approach to timing recovery described herein can be applied to various types of signaling with various numbers of threshold levels in the "eye" pattern. For almost any realistic type of signaling, the times at which the received baseband signal crosses one or more threshold levels can be used to obtain early and late indications, which can be used to drive the pulse ADD/DELETE circuit.

While there has been shown what is considered to be the preferred embodiments of the present invention, it will be manifest that many changes and modification may be made therein without departing from the essential spirit of the invention. It is intended, therefore, in the annexed claims, to cover all such changes and modifications as may fall within the true scope of the invention.

I claim:

1. In combination with a digital data receiver of the multidata level type that provides a baseband signal containing intersymbol interference components along with transmitted digital data, transmitted at a baud rate, the improvement of an initial timing recovery circuit comprising in combination:

clock means for providing a train of pulses having a repetition rate greater than the baud rate of the transmitted signal;

a pulse ADD/DELETE means for receiving said provided pulse train and for adding or deleting pulses from said pulse train in response to ADD or DELETE signals, respectively, in order to change the phase of said pulse train;

frequency divider means for dividing the frequency of the pulse train from said ADD/DELETE means down to the baud signaling frequency;

threshold crossing detector means receiving as inputs the received baseband signal and at least one threshold level signal of an absolute amplititude approximately equal to the amplitude of the main peak of the waveform received in response to a single transmitted pulse of unity amplitude, said detector means providing an output signal indicative of said baseband signal amplitude crossing said threshold amplitude level; and EARLY/LATE detector means for sensing the output pulse train from said frequency divider means and for comparing the occurrence of each pulse in said pulse train against the output signal from said threshold crossing detector means, and providing an ADD signal to said ADD/DELETE means when the compared pulse occurs prior to the occurrence of the output signal and a DELETE signal when the compared pulse occurs after the start of the output signal, said EARLY/LATE detector means thereby averaging the response to the amplitude threshold crossings of said baseband signal and establishing a timing reference in accordance with the average of the said amplitude threshold crossings.

2. The combination according to claim 1 wherein there are provided two said threshold levels of equal absolute amplitude but of opposite polarity.

3. The combination according to claim 2 wherein said EARLY/LATE detector means is comprised of:

first and second AND gates, each receiving as an input the output signal from said threshold crossing detector means;

a one-shot multivibrator receiving as an input the signal from said frequency divider means, said multivibrator changing state upon receipt of said frequency divider signal, the output of said multivibrator being fed to said first AND gate as an input signal so as to gate the signal from said threshold crossing detector means to said ADD/DELETE circuit as said ADD signal.

a NOT circuit receiving the signal from said one-shot multivibrator and providing an output signal to said second AND gate when none exists at the output of said mlutivibrator, such that the signal from said threshold crossing detector means is gated to said ADD/DELETE circuit as said DELETE signal.

4. The combination according to claim 2 wherein said threshold crossing detector comprises:

a first comparator means for receiving said baseband signal and one of said threshold level signals and providing an output signal when said baseband signal amplitude crosses said one threshold level;

a second comparator means for receiving said baseband signal and the other of said threshold level signals and providing an output signal when said baseband amplitude crosses said other threshold level; and OR gate means receiving the output signals from said first and said second comparator means and providing an output signal indicative of the presence of an output signal from said first or second comparator.

5. The combination according to claim 4 and further comprising:

means for receiving the output signal from said OR gate means and for transforming said output signal into a pulse output signal corresponding in frequency and phase to said output signal.

6. The combination according to claim 4 and further comprising:

differentiator means for receiving and differentiating the output signal from said OR gate means; and rectifier means for rectifying said differential signals, said rectified signals fed to the input of said EARLY/LATE detector means.

7. In combination with a digital data receiver of the multidata level type that provides a baseband signal containing intersymbol interference components along with transmitted digital data, transmitted at a baud rate, the improvement of an initial timing recovery circuit comprising in combination:

clock means for providing a train of pulses having a repetition rate greater than the baud rate of the transmitted signal;

a pulse ADD/DELETE means for receiving said provided pulse train and for adding or deleting pulses from said pulse train in response to ADD or DELETE signals, respectively, in order to change the phase of said pulse train;

frequency divider means for dividing the frequency of the pulse train from said ADD/DELETE means down to the baud signaling frequency;

threshold crossing detector means for receiving as an input the received baseband signal and for providing an output signal indicative of whether said baseband signal has an amplitude above or below a threshold set halfway between data levels; said detector means comprising: the compared after the the compared of the output a first comparator means for receiving said baseband signal and a first threshold level signal set midway between data levels and for providing an output signal when said baseband signal has an amplitude greater than said first threshold level;

a second comparator means for receiving said baseband signal and a second threshold level signal set midway between data levels and for providing an output signal when said baseband signal has an amplitude less than said second threshold level;

OR gate means receiving the output signals from said first and said second comaprator means and for providing an output signal indicative of the presence of an output signal from said first or said second comparator; and EARLY/LATE detector means for sensing the output pulse train from said frequency divider means and for comparing the occurrence of each pulse in said pulse train against the output signal from said threshold crossing detector means, and providing an ADD signal to said ADD/DELETE means when the composed pulse occurs prior to the occurrence of the output signal and a DELETE signal when the compound pulse occurs after the start of the output signal.

8. The combination according to claim 7 and further comprising:

means for receiving the output signal from said OR gate means and for transforming said output signal into a pulse output signal corresponding in frequency and phase to said output signal.

9. The combination according to claim 7 and further comprising:

differentiator means for receiving and differentiating the output signal from said OR gate means;

rectifier means for rectifying said differentiated signals, said rectified signals fed to the input of said EARLY/LATE detector means.

10. In combination with a pulsed data receiver of the multidata level type that has an impulse response such that a transmitted pulse generates a received waveform having the shape of a main peak and trailing peaks of lesser amplitudes with said pulses transmitted at a baud rate to form a received signal containing intersymbol interference components, the improvement of an initial timing recovery circuit comprising in combination:

means providing a pulse train having a repetition rate greater than the baud rate of transmitted pulses;

a pulse ADD/DELETE means for receiving said provided pulse train and for adding or deleting pulses from said pulse train in response to ADD or DELETE signals, respectively, in order to change the phase of said pulse train;

frequency divider means for dividing the frequency of the pulse train from said ADD/DELETE means down to the baud signaling frequency:

threshold crossing detector mean having as an input said received signal and at least one threshold level signal of an absolute amplitude approximately equal to the amplitude of the main peak of the waveform received in response to a single transmitted pulse of unity amplitude, said detector means providing an output pulse each time said received signal amplitude crosses said threshold amplitude level;

EARLY/LATE detector means for sensing the output pulse train from said frequency divider means and for comparing the occurrence of each pulse in said pulse train against the output from said threshold crossing detector means, and providing an ADD signal to said ADD/DELETE means when the compared pulse occurs prior to the occurrence of the output pulse and a DELETE signal when the compared pulse occurs after the start of the output pulse. said EARLY/LATE detector means thereby averaging the response to the amplitude threshold crossings of said baseband signal and establishing a timing reference in accordance with the average of the said amplitude threshold crossings.

11. The combination according to claim 10 wherein said EARLY/LATE detector means is comprised of:

first and second AND gates, each receiving as an input the output signal from said threshold crossing detector means;

a one-shot multivibrator receiving as an input the signal from said frequency divider means, said multivibrator changing state upon receipt of said frequency divider signal, the output of said multivibrator being fed to said first AND gate as an input signal so as to gate the signal from said threshold crossing detector means to said ADD/DELETE circuit as said ADD signal;

a NOT circuit receiving the signal from said one-shot multivibrator and providing an output signal to said second AND gate when none exists at the output of said multivibrator, such that the signal from said threshold crossing detector mkans is gated to said ADD/DELETE circuit as said DELETE signal.

* * * * *

PO-1050
(5/69)

UNITED STATES PATENT OFFICE
CERTIFICATE OF CORRECTION

Patent No. 3,745,248 Dated July 10, 1973

Inventor(s) Earl D. Gibson

It is certified that error appears in the above-identified patent and that said Letters Patent are hereby corrected as shown below:

Column 7, Claim 7, line 53, delete the words "the compared after the";

Column 7, Claim 7, line 54, delete the words "the compared of the output".

Column 8, Claim 7, line 9, delete "composed" and insert therefor --compared--;

Column 8, Claim 7, line 11, delete "compound" and insert therefor --compared--.

Column 8, Claim 10, line 45 delete "mean" and insert therefor --means--;

Column 10, Claim 11, line 8, delete "mkans" and insert therefor --means--.

Signed and sealed this 22nd day of January 1974.

(SEAL)
Attest:

EDWARD M. FLETCHER, JR.
Attesting Officer

RENE D. TEGTMEYER
Acting Commissioner of Patents